(12) United States Patent
Hung et al.

(10) Patent No.: US 12,455,637 B2
(45) Date of Patent: Oct. 28, 2025

(54) MOUSE DEVICE CAPABLE OF ELIMINATING AN IMPROPER CLEARANCE

(71) Applicant: Voyetra Turtle Beach, Inc., San Diego, CA (US)

(72) Inventors: Ying Chieh Hung, New Taipei (TW); Chieh Hua Yuan, New Taipei (TW)

(73) Assignee: Voyetra Turtle Beach, Inc., San Diego, CA (US)

( * ) Notice: Subject to any disclaimer, the term of this patent is extended or adjusted under 35 U.S.C. 154(b) by 0 days.

(21) Appl. No.: 18/700,845

(22) PCT Filed: Oct. 14, 2022

(86) PCT No.: PCT/US2022/078087
§ 371 (c)(1),
(2) Date: Apr. 12, 2024

(87) PCT Pub. No.: WO2023/069869
PCT Pub. Date: Apr. 27, 2023

(65) Prior Publication Data
US 2024/0419262 A1    Dec. 19, 2024

(30) Foreign Application Priority Data

Oct. 19, 2021    (TW) .................................. 110212286
Oct. 27, 2021    (CN) .......................... 202122592963.3

(51) Int. Cl.
G06F 3/0354    (2013.01)
G06F 3/02    (2006.01)

(52) U.S. Cl.
CPC ........ G06F 3/03543 (2013.01); G06F 3/0202 (2013.01)

(58) Field of Classification Search
CPC ........................... G06F 3/03543; G06F 3/0202
USPC ......................................................... 345/163
See application file for complete search history.

(56) References Cited

U.S. PATENT DOCUMENTS

| 10,248,225 | B1 |   | 4/2019 | Tseng |   |
|---|---|---|---|---|---|
| 10,698,499 | B1 |   | 6/2020 | Chang |   |
| D892,116 | S | * | 8/2020 | Jansson | ........................ D14/402 |
| 2021/0090824 | A1 |   | 3/2021 | Kobuchi |   |

(Continued)

FOREIGN PATENT DOCUMENTS

| CN | 106648177 A |   | 5/2017 |   |
|---|---|---|---|---|
| CN | 115692073 A | * | 2/2023 | ............. H01H 13/10 |
| TW | M626260 U |   | 5/2022 |   |

*Primary Examiner* — Mark Edwards
(74) *Attorney, Agent, or Firm* — Sheppard Mullin Richter & Hampton LLP

(57) ABSTRACT

The present application provides a mouse device, comprising: a shell, a frame, a plurality of springs and a circuit board. The shell has a plurality of key panels which are equipped with cylinders, each of which has ends provided with a pressing face and a stop face opposite to each other; the circuit board is fixed in the shell and equipped with a plurality of switches; the frame is fixed in the shell; each of the springs is respectively fixed to two corresponding points of the frame, corresponding to the position of each of the cylinders, and each spring is springily pressed against the stop face; each of the cylinders is pulled down in the direction of each of the switches via springy pressing of each of the springs against each of the stop faces.

11 Claims, 6 Drawing Sheets

(56) References Cited

U.S. PATENT DOCUMENTS

2021/0132706 A1   5/2021  Liu
2021/0208703 A1*  7/2021  Tseng .................... G06F 3/0202

* cited by examiner

MOUSE DEVICE CAPABLE OF ELIMINATING AN IMPROPER CLEARANCE

CROSS-REFERENCE TO RELATED APPLICATIONS

This application is a National Phase application under 35 U.S.C. § 371 of PCT Application No. PCT/US2022/078087, filed Oct. 14, 2022, which application claims the benefit of Taiwan Patent Application No. 110212286, filed Oct. 19, 2021 (which issued as Taiwan Patent No. M626260 on May 1, 2022), and Chinese Patent Application No. 202122592963.3, filed Oct. 27, 2021 (which issued as Chinese Patent No. ZL 202122592963.3 on May 27, 2022), which are hereby incorporated herein by reference in their entirety.

TECHNICAL FIELD

The present application relates to a mouse and, more particularly, to a mouse device capable of eliminating an improper clearance.

BACKGROUND

The object of the present application is a mouse, comprising: a shell and switches installed in the shell, the shell being equipped with two key panels which are commonly known as the left mouse button and the right mouse button. When a user presses a key panel, the pressed part of the key panel will be pushed to press the switch to generate a switching signal accordingly.

However, an improper clearance may be generated between the pressed part of the key panel and the button of the switch in the prior mouses due to manufacturing tolerance. Therefore, when a user presses a key panel, an extra slow-moving distance actually exists because the key panel is not accurately pressed onto the button of the switch due to tolerance so that the key panel touches the button before the button is pressed down, resulting in a feel of not giving a quick and neat press and a fuzzy feedback strength, especially a more obvious fuzzy feel during quick continuous click, thus requiring an improvement.

SUMMARY

One of the purposes of the present application is to provide a mouse device capable of eliminating an improper clearance and even noise generated during a shake or vibration.

To achieve the above-mentioned purpose, the present application provides a mouse device capable of eliminating an improper clearance, which is used to eliminate an improper clearance and comprises: a shell having a plurality of (two or more) key panels, each of the key panels being equipped with a cylinder, the ends of the cylinder having a pressing face and a stop face opposite to each other; a circuit board fixed in the shell and equipped with a plurality of switches; a frame fixed in the shell; a plurality of springs, each of the springs being respectively fixed to two corresponding points of the frame, corresponding to the position of each of the cylinders, and springily pressed against the stop face of each of the cylinders; each of the cylinders is pulled down in the direction of each of the switches via springy pressing of each of the springs against each of the stop faces to eliminate the improper clearance between the pressing face of each of the cylinders and each of the switches.

Wherein one end of each of the springs is respectively fixed to each of the corresponding points of the frame, the other end of each of the springs is bent to form an arc bending section, and the arc bending section of each of the springs is respectively springily pressed against the stop face of each of the cylinders.

Wherein each of the springs has a straight section, the arc bending section and a curved part between the straight section and the arc bending section, and there is a gap between the bottom edge of the arc bending section and the straight section.

Wherein a plurality of protruding arms are protruded from the frame, each of the protruding arms has an allowable deformation space, the one end of each of the springs is respectively fixed to each of the protruding arms, the arc bending section of each of the springs is respectively located in the each of the allowable deformation spaces, and each of the allowable deformation spaces respectively allows elastic deformation of each of the arc bending sections.

Wherein a receiving space is respectively provided on one side of each of the cylinders, each of the stop faces is respectively exposed in each of the receiving spaces, and the arc bending section of each of the springs goes into each of the receiving spaces correspondingly and is springily pressed against each of the stop faces.

Wherein a plurality of protruding arms are protruded from the frame, the one end of each of the springs is respectively fixed to each of the protruding arms, and each of the protruding arms goes into each of the receiving spaces together with the arc bending section of each of the springs.

Wherein the shell includes a top shell structure and a base which are integrated with each other by assembling, and the circuit board is fixed to the base.

Wherein the top shell structure includes a cover and a key panel assembly, the cover and the base are integrated with each other by assembling, the cover has an opening, the key panel assembly is disposed on the cover, corresponding to the opening, and has each of the key panels, and the frame is erected and fixed to the base and supported between the top shell structure and the base.

Wherein the top shell structure includes a hood, the hood and the base are integrated with each other by assembling and have each of the key panels, the frame is an upwardly arched frame, the periphery of the frame and the periphery of the base are fixed to each other, the upwardly arched part of the frame snugly fits the internal surface of the hood and avoids each of the key panels, and the frame is supported between the internal surface of the hood and the periphery of the base.

Wherein a plurality of hollowed-out holes are spread all over the frame.

Compared with the prior art, the present application has the following benefits: It can provide a proper pressing elastic force to eliminate an improper clearance and noise generated during a shake or vibration. It can even have the benefits of easy assembly, low manufacturing cost, simple (uncomplicated) structure, avoidance of damage to the springs by cylinders during the assembly of key panels, easy adjustment to a pressing elastic force and no damage to the arc bending section due to blockage during deformation.

1: base; 2a, 2b: top shell structure; 21: cover; 211: opening; 22: key panel assembly; 221: key panel; 23: hood; 231: key panel; 26: cylinder; 261: end; 2611: pressing face; 2612: stop face; 263: receiving space; 3a, 3b: frame; 31a, 31b: protruding arm; 311a, 311b: allowable deformation space; 32: hollowed-out hole; 4: spring; 41: arc bending section; 42: curved part; 5: circuit board; 51: switch; 511: button.

PARTICULAR EMBODIMENTS

The present utility model will be further described by referring to the accompanying drawings and particular embodiments so that those skilled in the art can understand and implement the present utility model better, but the listed embodiments should not be used as limitations on the present utility model.

Figure 3:
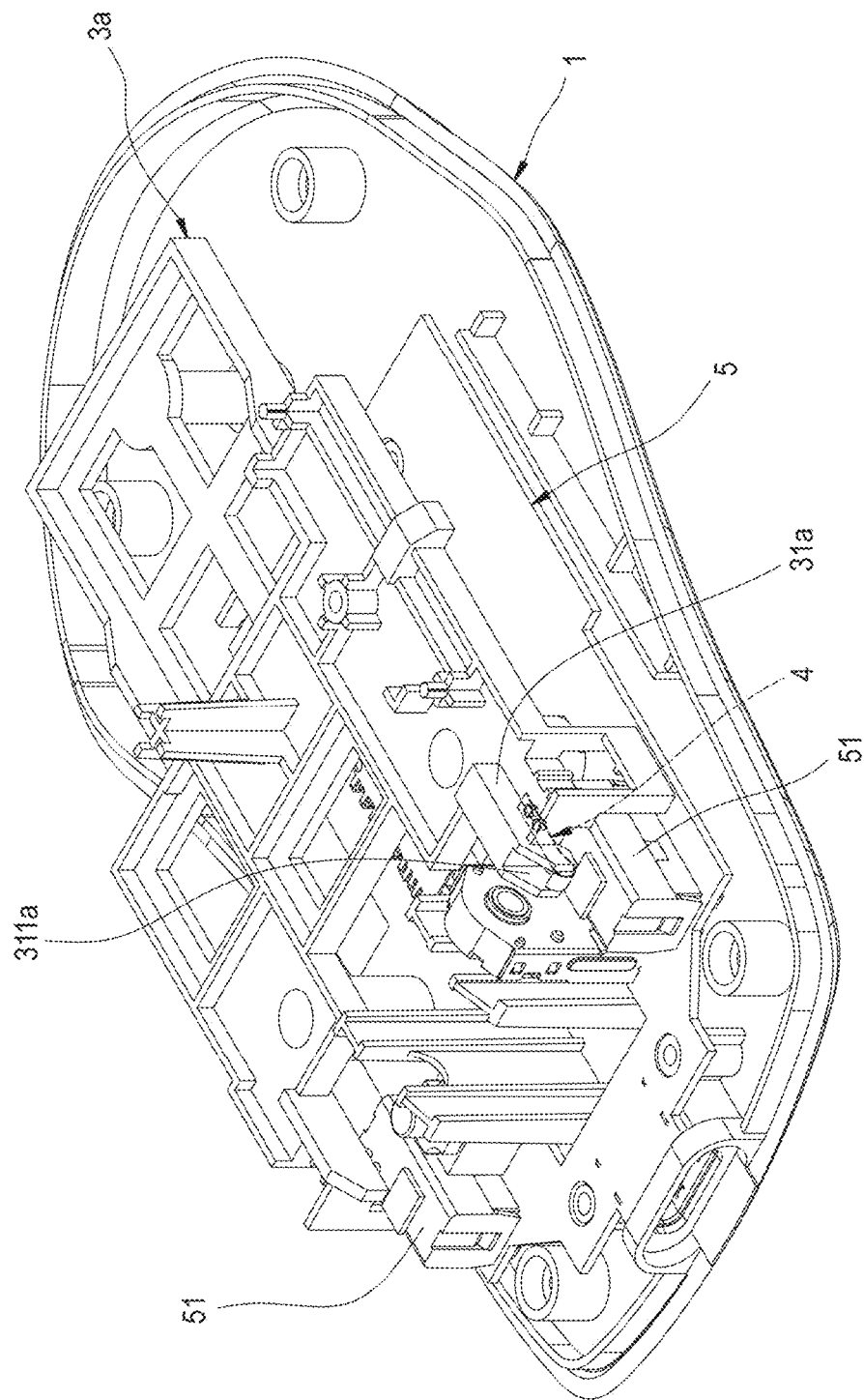
FIG. 3 is a 3D schematic diagram showing a first embodiment of the present application when the top shell structure is not assembled.
Figure 4:
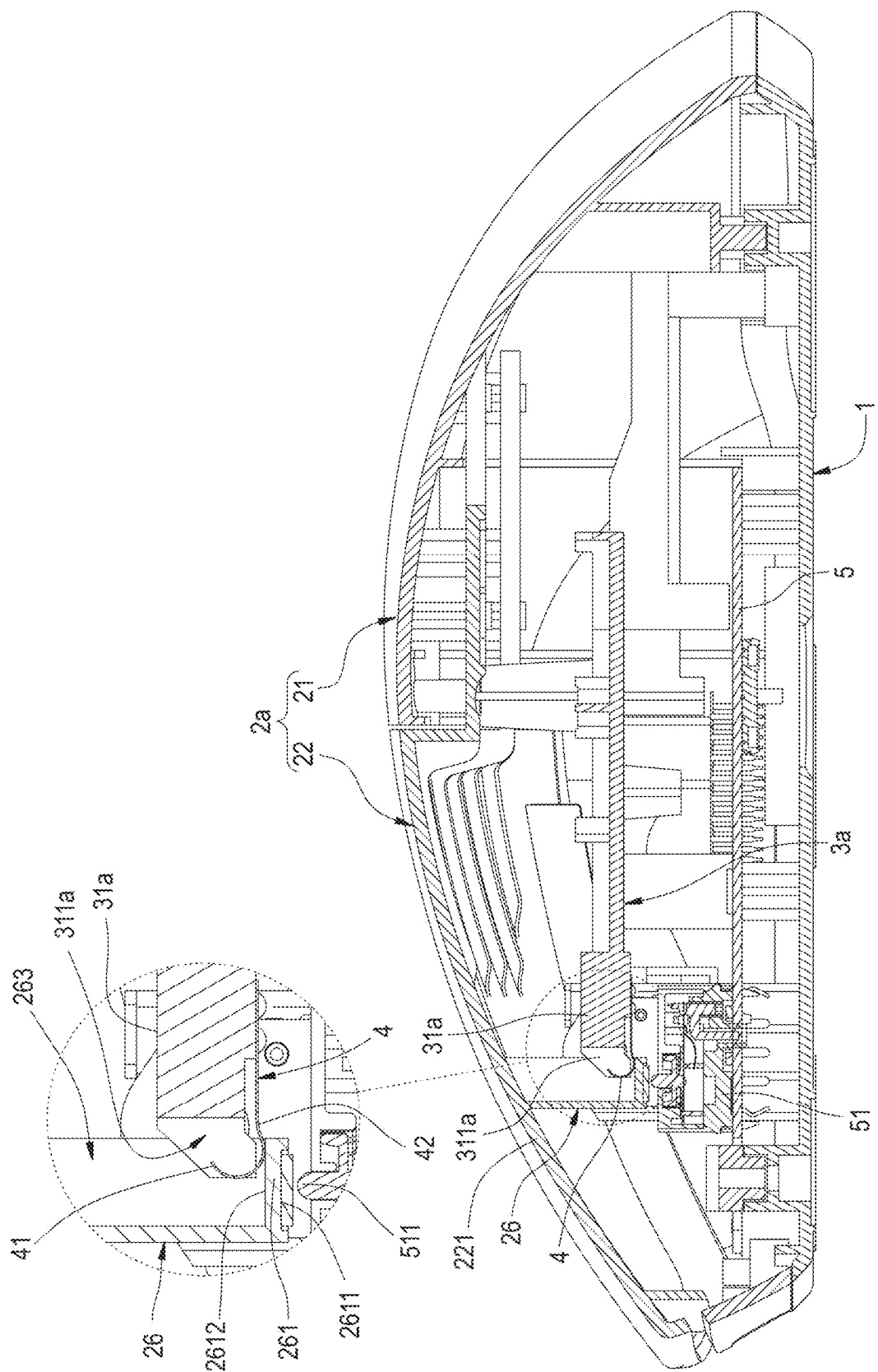
FIG. 4 is a sectional side view showing a first embodiment of the present application.
Figure 5:
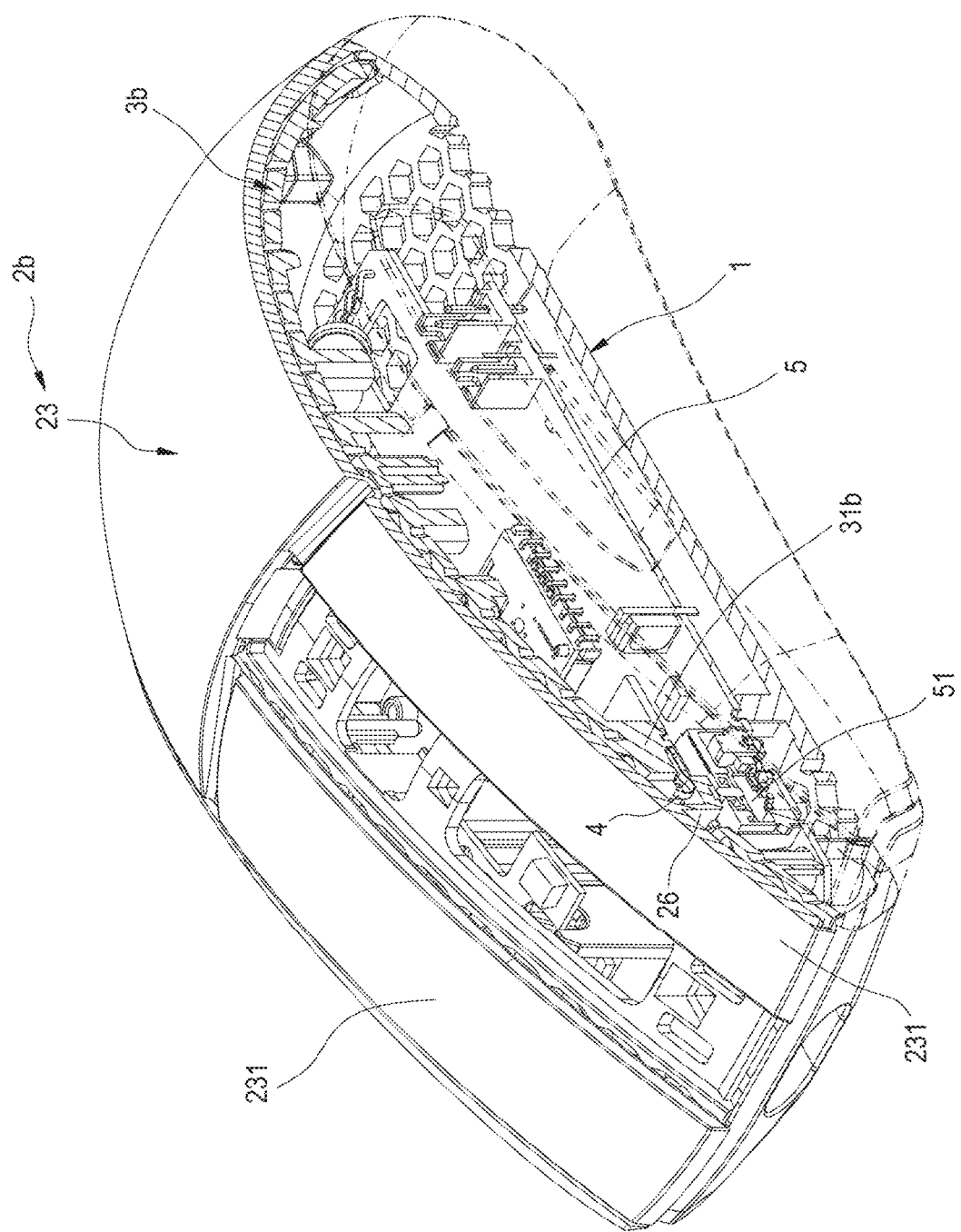
FIG. 5 is a 3D sectional view showing a second embodiment of the present application.
Figure 6:
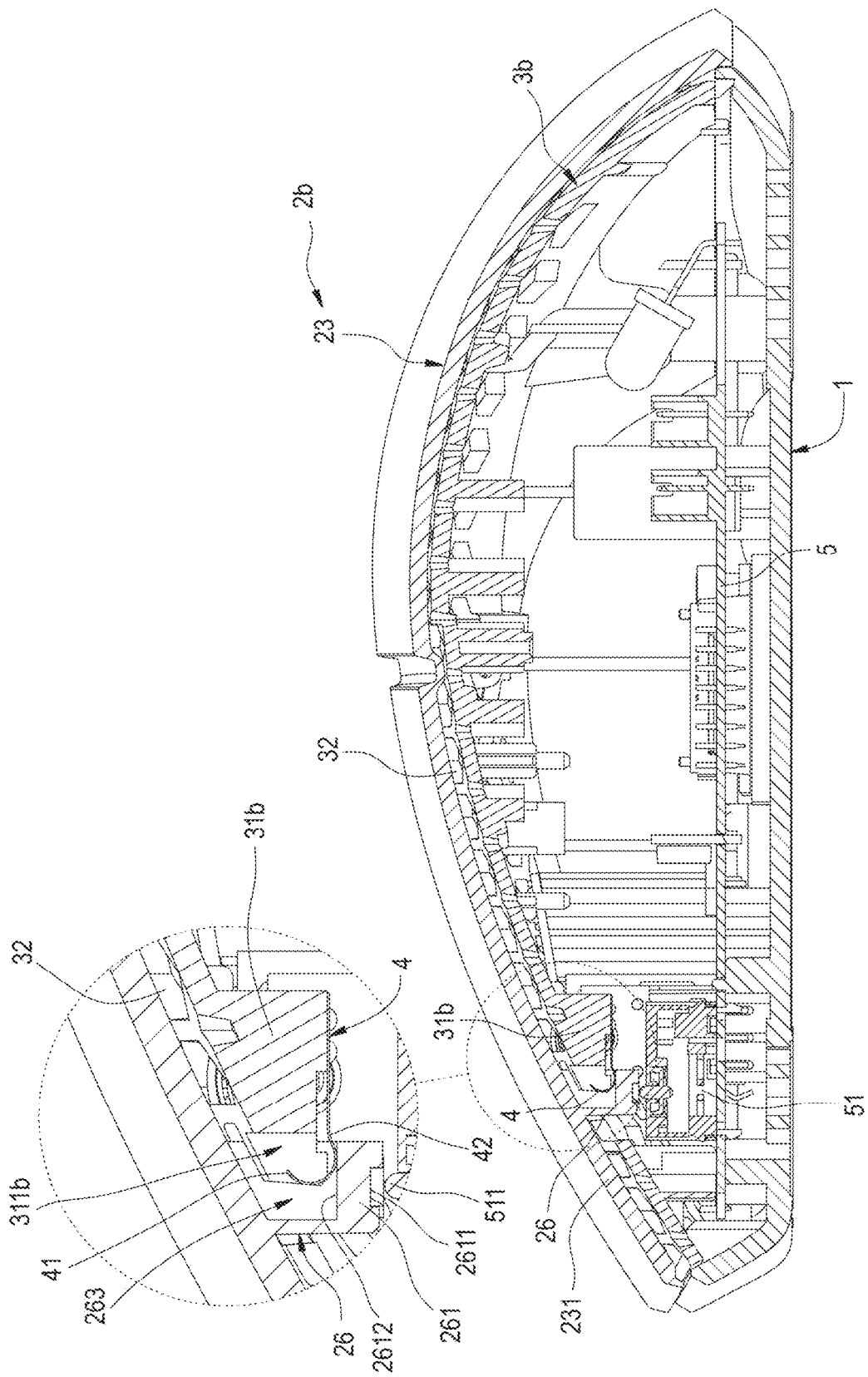
FIG. 6 is a sectional side view showing a second embodiment of the present application.

The present application provides a mouse device capable of eliminating an improper clearance, which is used to eliminate an improper clearance (not shown in the figures). A first embodiment is shown in FIGS. 1-4. A second embodiment is shown in FIGS. 5-6.

As shown in FIGS. 1-4, the first embodiment of a mouse device capable of eliminating an improper clearance (hereinafter referred to as "mouse device") of the present application comprises: a shell (the component symbol not indicated), a frame 3a, a plurality of springs 4 and a circuit board 5.

The shell includes a base 1 and a top shell structure 2a which are integrated with each other by assembling. The top shell structure 2a includes a cover 21 and a key panel assembly 22. The cover 21 and the base 1 are integrated with each other by assembling; the cover 21 has an opening 211, and the key panel assembly 22 is disposed on the cover 21, corresponding to the opening 211, and has a plurality of (at least two) side-by-side key panels 221.

A cylinder 26 is protruded from the internal surface of the key panels 221. As shown in FIG. 4, an end 261 of the cylinder 26 has a pressing face 2611 and a stop face 2612 opposite to each other. Preferably, a receiving space 263 is provided on one side of the cylinder 26 and the stop face 2612 is exposed in the receiving space 263. Specifically, the stop face 2612 is formed by providing the receiving space 263 in the cylinder 26 and the pressing face 2611 is opposite to the stop face 2612.

The circuit board 5 is fixed in the shell. As shown in FIGS. 3 and 4, the circuit board 5 is specifically fixed to the base 1 and equipped with a plurality of switches 51. As shown in FIG. 4, a button 511 is disposed on the top surface of the switch 51.

The frame 3a is fixed in the shell. As shown in FIGS. 3 and 4, the frame 3a is specifically erected and fixed to the base 1 or to the base 1 and the circuit board 5, and the frame 3a is supported between the cover 21 and the base 1 to improve the structural strength of the shell.

Each of the springs 4 is respectively fixed to two corresponding points of the frame 3a, corresponding to the position of each of the cylinders 26 (the component symbol not indicated), and is springily pressed against the stop face 2612 of each of the cylinders 26.

As shown in FIG. 4, even though an improper clearance exists between the pressing face 2611 of each of the cylinders 26 and the button 511 of each of the switches 51 due to tolerance (not shown in the figure), each of the cylinders 26 is pulled down in the direction of the switches 51 together with each of the panels 211 via springy pressing of each of the springs 4 against each of the stop faces 2612 to eliminate each of the improper clearances and even noise generated during a shake or vibration.

Figure 1:
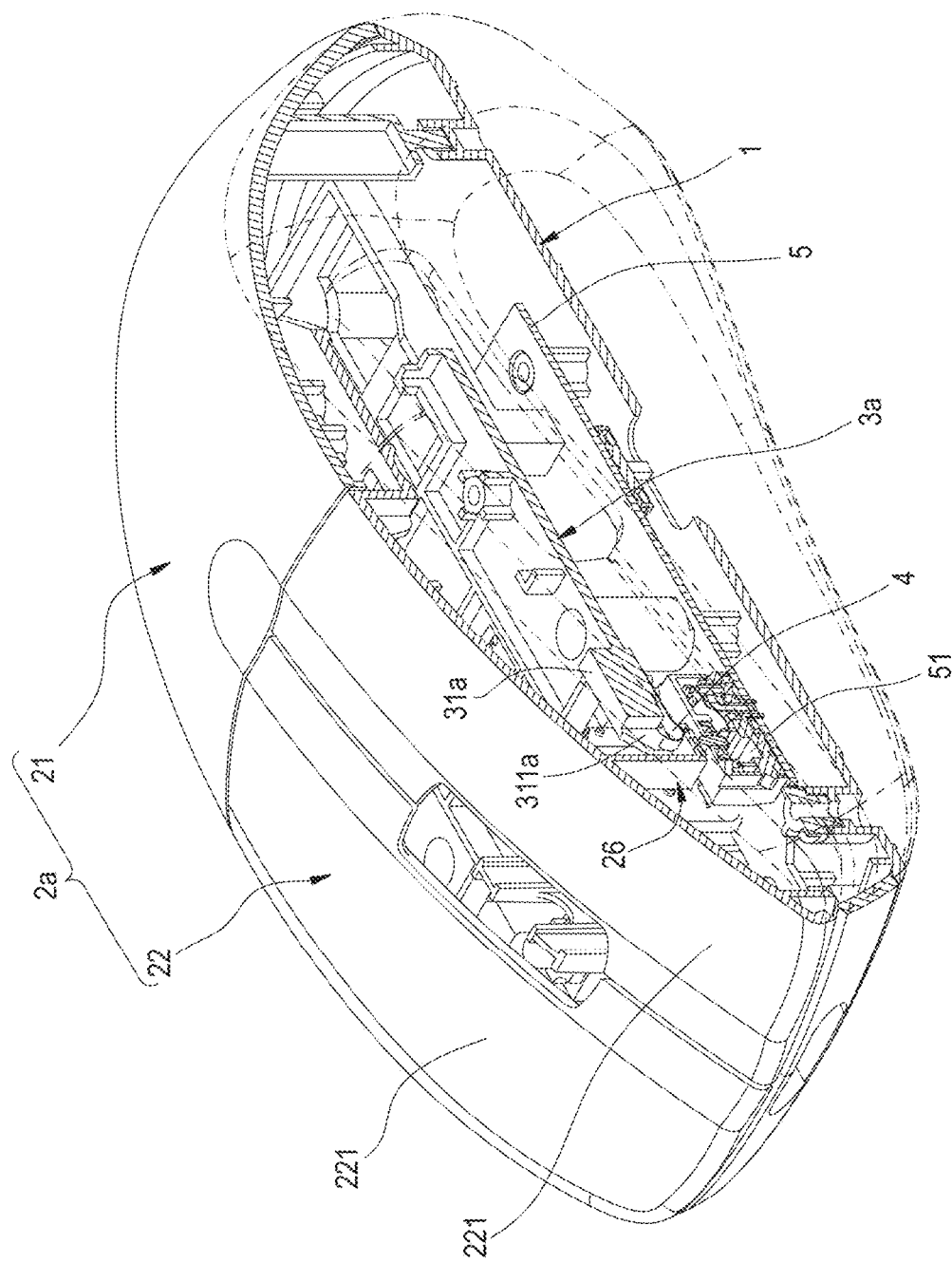
FIG. 1 is a 3D sectional view of a first embodiment of the present application.
Figure 2:
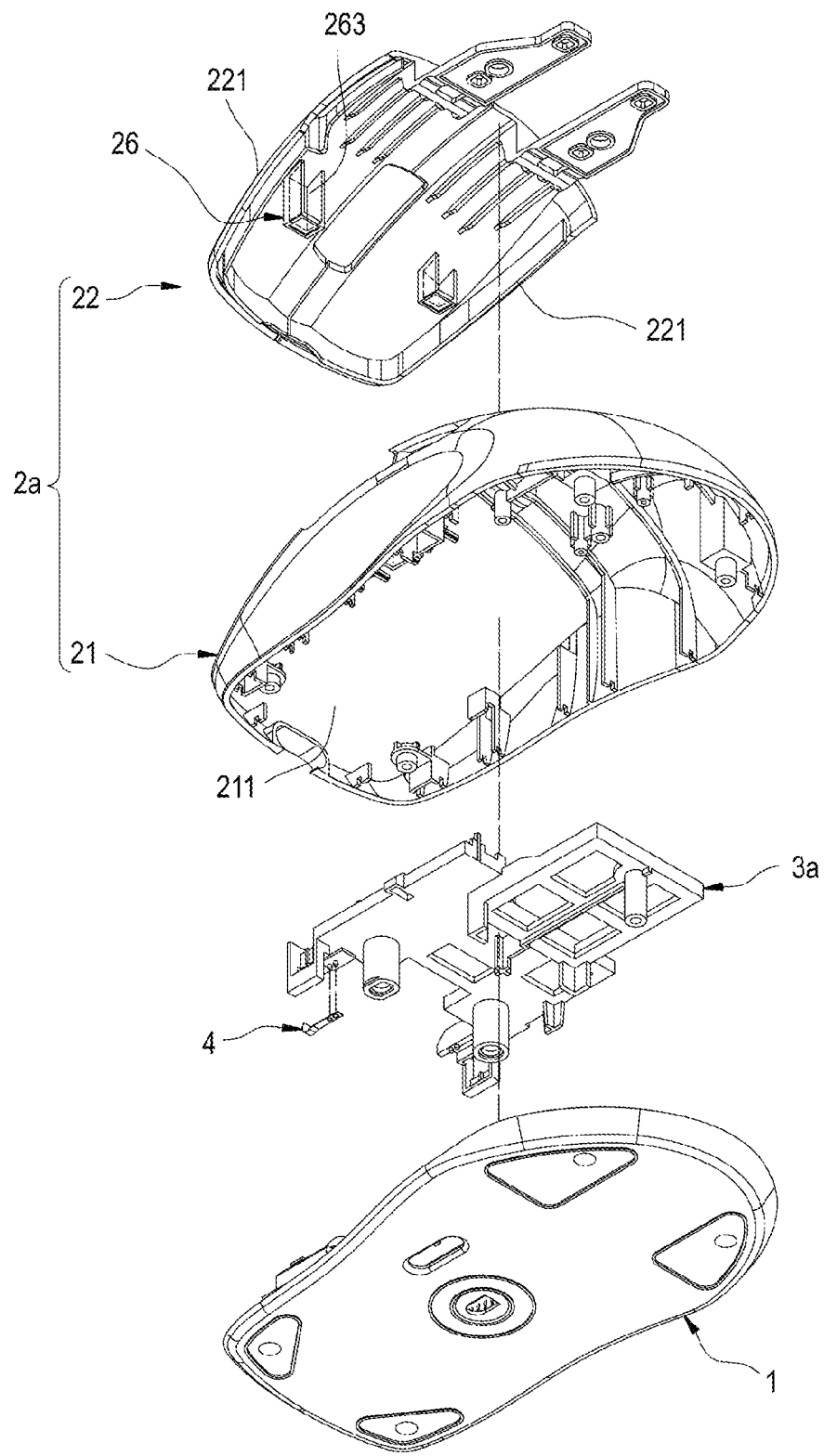
FIG. 2 is a 3D exploded bottom view of a first embodiment of the present application.

As shown in FIGS. 1, 3 and 4, one end of the springs 4 is fixed to the corresponding points of the frame 3a by various feasible methods (e.g., locking or hot melting method), and the other end of the spring 4 is bent to form an arc bending section 41 which goes into the receiving space 263 of the cylinder 26. The arc bending section 41 which goes into the receiving space 263 is springily pressed against the stop faces 2612 in the direction of the switch 51. Preferably, each of the springs 4 has a straight section (the component symbol not indicated), the arc bending section 41 and a curved part 42 between the straight section and the arc bending section 41. In addition, as shown in FIG. 4, there is a gap between the bottom edge of the arc bending section 41 and the straight section (the component symbol not indicated) so that each of the springs 4 is particularly elastic when the arc bending section 41 is springily pressed against the stop face 2612 of each of the cylinders 26.

A plurality of protruding arms 31a are protruded from the frame 3a and each of the protruding arms 31a has an allowable deformation space 311a at one end. The one end of each of the springs 4 is respectively fixed to the bottom surface of each of the protruding arms 31a, and the arc bending section 41 of each of the springs 4 respectively goes into each of the allowable deformation spaces 311a so that each of the allowable deformation spaces 311a respectively allows elastic deformation of each of the arc bending sections 41 when the arc bending section 41 is deformed due to an external force.

It is important to note that only the arc bending section 41 of each of the springs 4 respectively goes into the space 263 of each of the cylinders 26 (not shown in the figure), as mentioned above. Of course, each of the protruding arms 31 can also go into each of the receiving spaces 263 together with each of the arc bending sections 41 to achieve the benefit of protecting the arc bending section 41 at the time of assembly, as shown in FIG. 4.

Other benefits provided by the present application: The present application has the benefit of easy assembly because of the assembly method in which the springs 4 are fixed to the bottom surface of the protruding arms 31a of the frame 3a by a locking or hot melting method without any complex structure or special assembly. The present application has the benefits of low manufacturing cost and simple (uncomplicated) structure because the improper clearance can be eliminated at only a cost of simple springs 4. Because the spring 4 has an arc bending section 41 and there is the above-mentioned gap between the bottom edge of the arc bending section 41 and the straight section, a proper pressing elastic force can be provided to eliminate the improper clearance. Because the spring 4 has an arc bending section 41, the present application has the benefit of avoiding damages to the springs 4 by the cylinders 26 during assembly of the key panels 221. If the pressing elastic force of the springs 4 needs to be adjusted, just adjust the above-mentioned gap between the bottom edge of the arc bending section 41 and the straight section. Therefore, the present application has the benefit of easy adjustment to the pressing elastic force. Because the protruding arm 31a has an allowable deformation space 311a, even if the arc bending section 41 is deformed by accident due to external forces during assembly, these deformations of the arc bending section 41 will occur only in the allowable deformation space 311a so that the arc bending section 41 is not damaged due to blockage during deformation.

As shown in FIGS. 5 and 6, the second embodiment of the mouse device of the present application is roughly the same as the first embodiment. The only difference is that the top shell structure 2b and the frame 3b are different from those of the first embodiment, as mentioned below.

The top shell structure 2b includes a hood 23 which has a plurality of key panels 231 or integrally connected key panels 231. The hood 23 and the base 1 are integrated with each other by assembling.

The frame 3b is an upwardly arched frame and has a plurality of protruding arms 31b, each of which has an allowable deformation space 311b. The periphery of the frame 3b and the periphery of the base 1 are fixed to each other, and the upwardly arched part of the frame 3b snugly fits the internal surface of the hood 23 (except each of the key panels 231) so that the frame 3b is supported between the interface surface of the hood 23 and the periphery of the base 1 to improve the structural strength of the shell. In addition, a plurality of (more than three) hollowed-out holes 32 are spread all over the frame 3b for reducing the weight, as shown in FIG. 6.

The above-mentioned embodiments are preferred embodiments only which fully describe the present utility model, and the protection scope of the present utility model is not limited to them. Any equivalent substitutions or changes made by those skilled in the art on the basis of the present utility model shall fall within the protection scope of the present utility model. The protection scope of the present utility model is subject to the claims.

The invention claimed is:

1. A mouse device comprising:
a shell comprising a plurality of key panels, each of the key panels comprising a cylinder, and ends of the cylinders comprise a pressing face and a stop face opposite the pressing face;
a circuit board within the shell, the circuit board comprising a plurality of switches;
a frame with a plurality of protruding arms is disposed in the shell; and
a plurality of springs, each of the springs being fixed to two corresponding points of the protruding arms, and each of the springs being springily pressed against the stop face of its corresponding cylinder, wherein each of the springs comprises an arc bending section extending at least partially into an allowable deformation space located in its corresponding protruding arm;
wherein, each of the cylinders is pulled in a direction of its corresponding switch via pressure of each of the springs against the stop face of its corresponding cylinder to eliminate noise caused by vibrations to the mouse device.

2. The mouse device according to claim 1, wherein one end of each of the springs is respectively fixed to the corresponding points of the protruding arms, the other end of each of the springs is bent to form the arc bending section, and the arc bending section of each of the springs is respectively springily pressed against the stop face of each of the cylinders.

3. The mouse device according to claim 2, wherein each of the springs comprises a straight section, the arc bending section and a curved part between the straight section and the arc bending section.

4. The mouse device according to claim 2, wherein the plurality of protruding arms are protruded from the frame, wherein one end of each of the springs is respectively fixed to its corresponding protruding arm, the arc bending section of each of the springs is respectively located in the allowable deformation space of a corresponding protruding arm.

5. The mouse device according to claim 2, wherein each of the stop faces are exposed in each of the corresponding receiving spaces, the arc bending section of each of the springs goes into each of the receiving spaces correspondingly and is springily pressed against each of the stop faces.

6. The mouse device according to claim 5, wherein the plurality of protruding arms are protruded from the frame, wherein one end of each of the springs is fixed to a corresponding protruding arm of the plurality of protruding arms, and each of the protruding arms goes into each of the receiving spaces together with the arc bending section of each of the springs.

7. The mouse device according to claim 1, wherein the shell further comprises a top shell structure and a base which are integrated with each other.

8. The mouse device according to claim 7, wherein the top shell structure comprises a cover and a key panel assembly integrated with the cover, the cover comprises an opening and the key panel assembly is disposed on the cover.

9. The mouse device according to claim 7, wherein the top shell structure comprises a hood integrated with the base, the frame is an upwardly arched frame, a periphery of the frame and a periphery of the base are fixed to each other, and the frame is supported between an internal surface of the hood and the periphery of the base.

10. The mouse device according to claim 9, wherein a plurality of hollowed-out holes are spread all over the frame.

11. The mouse device according to claim 1, each of the cylinders is pulled down in the direction of each of the switches in an amount sufficient to eliminate any improper clearance between the pressing face of each of the cylinders and each of the switches.

* * * * *